US012811854B2

(12) United States Patent
Palnati et al.

(10) Patent No.: US 12,811,854 B2
(45) Date of Patent: *Nov. 24, 2026

(54) DYNAMIC MODIFICATION OF TRAFFIC MONITORING POLICIES FOR A CONTAINERIZED ENVIRONMENT

(71) Applicant: Gigamon Inc., Santa Clara, CA (US)

(72) Inventors: Saritha Palnati, Fremont, CA (US); Naveed Cochinwala, San Jose, CA (US)

(73) Assignee: Gigamon Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/085,146

(22) Filed: Mar. 20, 2025

(65) Prior Publication Data

US 2025/0267067 A1 Aug. 21, 2025

Related U.S. Application Data

(63) Continuation of application No. 18/165,250, filed on Feb. 6, 2023, now Pat. No. 12,261,748.

(51) Int. Cl.

| | |
|---|---|
| ***H04L 41/0894*** | (2022.01) |
| ***H04L 41/0816*** | (2022.01) |
| ***H04L 41/40*** | (2022.01) |

(52) U.S. Cl.

CPC ...... *H04L 41/0894* (2022.05); *H04L 41/0816* (2013.01); *H04L 41/40* (2022.05)

(58) Field of Classification Search

None

See application file for complete search history.

(56) References Cited

U.S. PATENT DOCUMENTS

2022/0191099 A1* 6/2022 Pieczul ............... H04L 41/0266
2023/0319114 A1* 10/2023 Kaimal .................. H04L 63/20 726/9

(Continued)

OTHER PUBLICATIONS

Extended European Search Report from European Patent Application No. 24155889.9 dated Jul. 1, 2024. (10 pages).

(Continued)

*Primary Examiner* — Fadi Haj Said

(74) *Attorney, Agent, or Firm* — Van Hoven PC; Jordan Becker

(57) ABSTRACT

A method of automatic and dynamic environment discovery and policy adaptation for a containerized environment is disclosed. A plurality of traffic monitoring policies for acquiring and monitoring data traffic transmitted between one or more components of a containerized environment are accessed. The containerized environment includes a plurality of software-implemented containers. The traffic monitoring policies are caused to be applied to one or more components in the containerized environment. A change to a configuration of the containerized environment is automatically detected. In response, one or more containers of the plurality of software-implemented containers are automatically identified as containers affected by the change. Based on that identification, a modification of a traffic monitoring policy is then automatically determined to produce a modified traffic monitoring policy, and the modified traffic monitoring policy is caused to be applied to one or more components in the containerized environment.

21 Claims, 10 Drawing Sheets

(56) References Cited

U.S. PATENT DOCUMENTS

| | | | | |
|---|---|---|---|---|
| 2024/0086253 | A1* | 3/2024 | Venkata | H04L 41/0806 |
| 2024/0214448 | A1* | 6/2024 | Thiruveedula | H04L 67/56 |

OTHER PUBLICATIONS

Moradi et al. "ConMon: an Automated Container Based Network Performance Monitoring System," IFIP/IEEE International Symposium on Integrated Network and Service Management, May 8, 2017, pp. 54-62.

* cited by examiner

| Container ID | Name | Podname | Nodename | Servicename | Namespace | Pod IPS | Node IP | Service IP | Labels |
|---|---|---|---|---|---|---|---|---|---|
| | | | | | | | | | |
| | | | | | | | | | |
| | | | | | | | | | |

601

| Pod ID | Name | Nodename | Servicename | Namespace | Pod IPS | Labels |
|---|---|---|---|---|---|---|
| | | | | | | |
| | | | | | | |
| | | | | | | |

602

| Service ID | Name | Service Port | Service IP | Namespace | Selector | Labels |
|---|---|---|---|---|---|---|
| | | | | | | |
| | | | | | | |
| | | | | | | |

603

| Node ID | Name | IP | Labels |
|---|---|---|---|
| | | | |
| | | | |
| | | | |

604

FIG. 6

DYNAMIC MODIFICATION OF TRAFFIC MONITORING POLICIES FOR A CONTAINERIZED ENVIRONMENT

This is a continuation of U.S. patent application Ser. No. 18/165,250, filed on Feb. 6, 2023, which is incorporated by reference herein in its entirety.

TECHNICAL FIELD

At least one embodiment of the present disclosure pertains to techniques for providing visibility into network traffic, and more particularly, to a technique for discovering changes to a containerized environment and dynamically adapting traffic monitoring policies to such changes.

BACKGROUND

Network communications traffic may be acquired at numerous entry points on a network by one or more devices called network traffic "visibility nodes" to provide extensive visibility of communications traffic flow and network security. These network traffic visibility nodes (or simply "visibility nodes" herein) may include physical devices, virtual devices, and Software Defined Networking (SDN)/Network Function Virtualization (NFV) environments, and may be collectively referred to as the computer network's "visibility fabric." Various kinds of network tools are commonly coupled to such visibility nodes and used to identify, analyze, and/or handle security threats to the computer network, bottlenecks in the computer network, etc. Examples of such tools include an intrusion detection system (IDS), an intrusion prevention system (IPS), a network monitoring system, and an application monitoring system. The network visibility nodes are typically used to route network traffic (e.g., packets) to and from one or more connected network tools for these purposes. Examples of network visibility nodes suitable for these purposes include any of the GigaVUE® series of visibility appliances available from Gigamon® Inc. of Santa Clara, California. A network visibility node can be a physical device or system, or it can be a virtual device that is hosted by a physical device or system. A network visibility node commonly applies one or more policies to acquire and monitor traffic communicated in the target network.

Containerization is a technique that is being increasingly used to deploy software in cloud environments. Containerization is a form of virtualization in which the components of an application are bundled into a single container image and can be run in isolated user space on the same shared operating system. Advantages of containerization are that it provides portability, scalability, fault tolerance and agility. An example of a popular system for providing containerization is the open source Kubernetes container orchestration system for automating software deployment, scaling, and management.

Containerization also creates challenges for traffic visibility, however. In order to apply traffic visibility policies (e.g., for determining where data traffic should be tapped), the visibility fabric must have detailed knowledge of the inventory and configuration of the containerized environment. However, a containerized environment tends to be very dynamic in nature, such that the inventory and configuration are subject to frequent change (indeed, that is one of the advantages of a containerized environment). For example, containers, services and/or nodes may be added or deleted on a frequent basis. Such changes can make it extremely difficult to adapt traffic visibility policies appropriately and quickly enough to meet users' needs. In general, an administrative user (e.g., administrator of the network visibility fabric) would have to determine which policies are affected by a given change to the environment, and adjust those policies manually. That is a slow and tedious process, which would result in the network visibility fabric undesirably being taken off-line or incorrect policies being implemented, for a period of time.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitation in the drawings, in which like references may indicate similar elements.

FIG. 6 illustrates an example of data structures including resource relationship information to facilitate determination of the relationships between various resources across levels of a containerization.

DETAILED DESCRIPTION

Figure 1A:
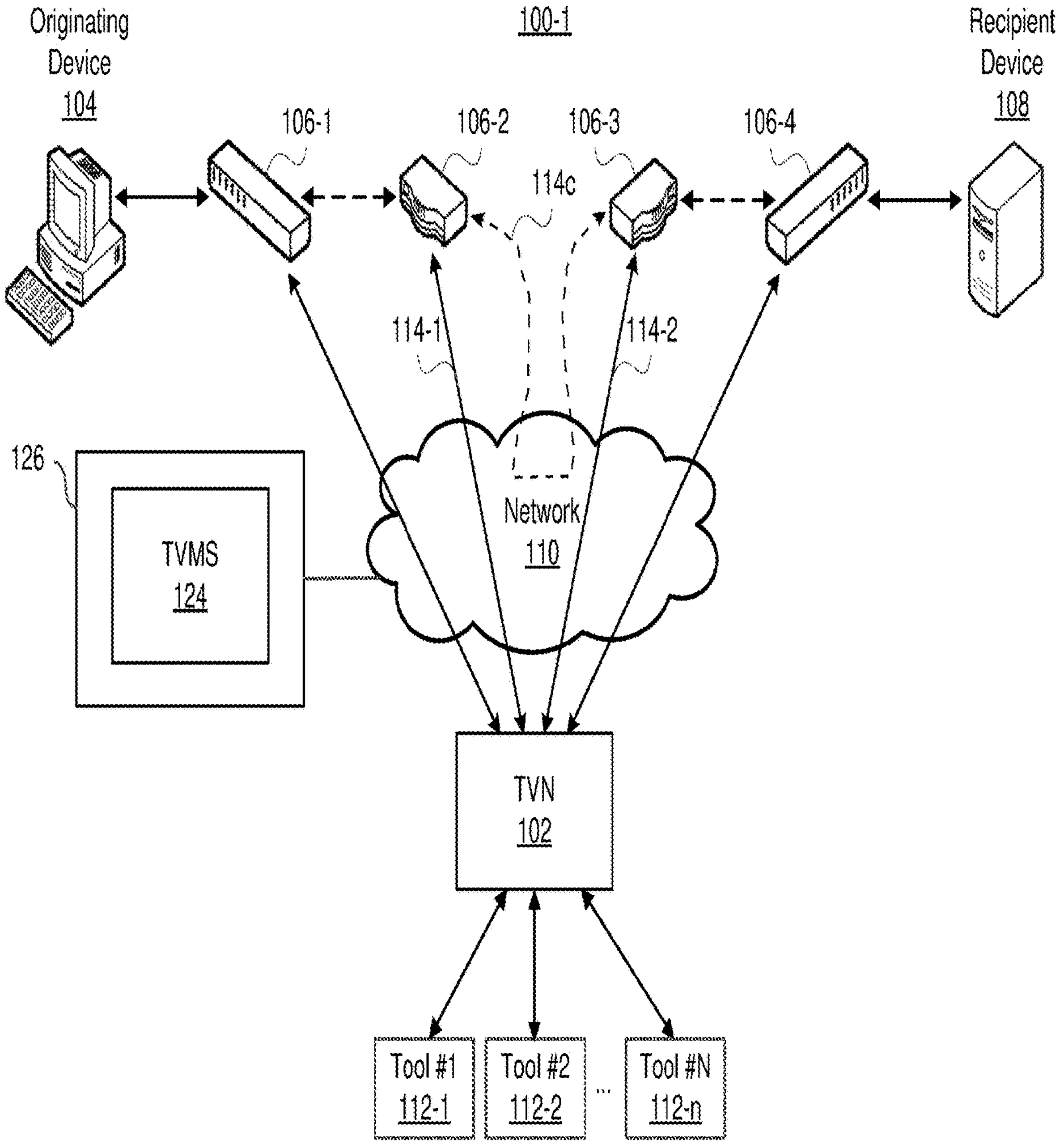
FIG. 1A depicts an example of a network arrangement in which a network visibility node receives data packets from nodes in a computer network.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is a technique for automatic and dynamic environment discovery and policy adaptation for a containerized environment. At least some aspects of the technique can be implemented in a network visibility management system (TVMS) that is used to manage a network traffic visibility fabric in a containerized environment, while other aspects may be implemented in one or more components of the containerized environment.

As described in greater detail below, in at least some embodiments a containerized environment includes various software-implemented containers. In a Kubernetes environment, for example, the containers are included in "pods," where each pod provides one or more services and is implemented within one of various worker nodes in the environment. In at least some embodiments of the technique introduced here, the TVMS maintains various traffic monitoring policies (at least some of which may be user-specified) and causes those policies to be applied to one or more containers and/or pods in the containerized environment. The policies include rules that define (among other things) which containers or pods should be tapped for traffic visibility monitoring, and how the data traffic tapped from those containers/pods should be routed to one or more network visibility nodes.

Any change to the configuration of the containerized environment may affect one or more traffic monitoring policies, such as when pods or containers scale up or down. Additionally, addition or deletion of a worker node impacts any policy that affects any pod or container within the added or deleted worker node. Without the technique introduced here, an administrative user would need to determine which pods/containers are affected by the change, and adjust each policy that affects those pods/containers (in some instances this may involve completely deleting/disabling a policy or adding/enabling a new policy). That can be a slow and tedious process.

Accordingly, in accordance with the technique introduced here, any change to a configuration of the containerized environment is automatically detected by the TVMS. In response to such change, the TVMS automatically identifies the container(s) that are affected by the change, and then the traffic monitoring policy or policies associated with that/those container(s). The TVMS then automatically modifies each affected traffic monitoring policy to reflect the change in the containerized environment and causes the modified policies to be applied to the appropriate components (e.g., pods or containers) in the containerized environment. Additional details of the technique are described below.

General System Overview

Before further considering the technique introduced here, it is useful to understand how a traffic visibility fabric can be employed in a non-containerized environment. FIG. 1A shows an example of a non-containerized network arrangement 100-1 in which a network traffic visibility node (TVN) 102 receives data packets from multiple devices and/or applications (collectively referred to as "nodes") in a computer network 110. The nodes (e.g., switches 106-1, 106-4 and routers 106-2, 106-3) couple an originating device 104 (e.g., desktop computer system) to a destination device 108 (e.g., server) and allow data packets to be transmitted between the originating device 104 and the destination device 108. Examples of nodes include switches, routers, and network taps.

Each node represents an entry point into the computer network 110. The entry points, however, could be, and often are, from different points within the computer network 110. Generally, at least some of the nodes are operable to transmit data packets received as network traffic (or duplicate copies of the data packets) to a TVN 102 for analysis. Thus, network traffic is directed to TVN 102 by a node that provides an entry point into the computer network 110.

Whether a node transmits the original data packets or copies of the data packets to a device downstream of the node (e.g., the TVN 102) depends on whether the downstream device is an inline device or an out-of-band or "tapped mode" device (i.e., where a copy of each packet is provided to the TVN 102 by a network tap. As noted above, inline devices receive the original data packets, while out-of-band devices receive copies of original data packets.

Here, for example, the TVN 102 can receive original data packets from node 106-2 (e.g., via transmission path 114-1) and pass at least some of the original data packets to node 106-3 (e.g., via transmission path 114-2). Because node 106-2 is able to transmit network traffic downstream through the TVN 102, node 106-2 need not be coupled directly to node 106-3 (i.e., transmission path 114*c* may not exist). Some or all of the nodes within the computer network can be configured in a similar fashion.

When the TVN 102 is deployed as an inline device, data packets are received by the network device at a (physical) network port of the network device. For example, data packets transmitted by node 106-2 via transmission path 114-1 are received by the TVN 102 at a particular network port. The network device may include multiple network ports coupled to different nodes in the computer network 110. The TVN 102 can be, for example, a physical monitoring platform that includes a chassis and interchangeable blades offering various functionalities, such as enhanced packet distribution and masking/filtering capabilities. Alternatively, TVN 102 can be implemented as a virtualized device that is hosted on a physical platform.

The TVN 102 can also include multiple (physical) tool ports coupled to different network tools 112-1 through 112-*n*. The TVN 102 and tools 112-1 through 112-*n* form at least a portion of a traffic visibility fabric. As further described below, each network tool 112-1 through 112-*n* can be deployed as an inline device or an out-of-band device at any given point in time. An administrator of the traffic visibility fabric may be able to switch the deployment mode of one or more of the network tools 112-1 through 112-*n*. That is, the administrator may be able to deploy an out-of-band network tool as an inline device and vice versa. When a network tool is deployed as an out-of-band device, the TVN 102 creates a duplicate copy of at least some of the data packets received by the TVN 102, and then passes the duplicate copies to a tool port for transmission downstream to the out-of-band network tool. When a network tool is deployed as an inline device, the network device passes at least some of the original data packets to a tool port for transmission downstream to the inline network tool, and those packets are then normally subsequently received back from the tool at a separate tool port of the network device, assuming the packets are not blocked by the tool.

Figure 1B:
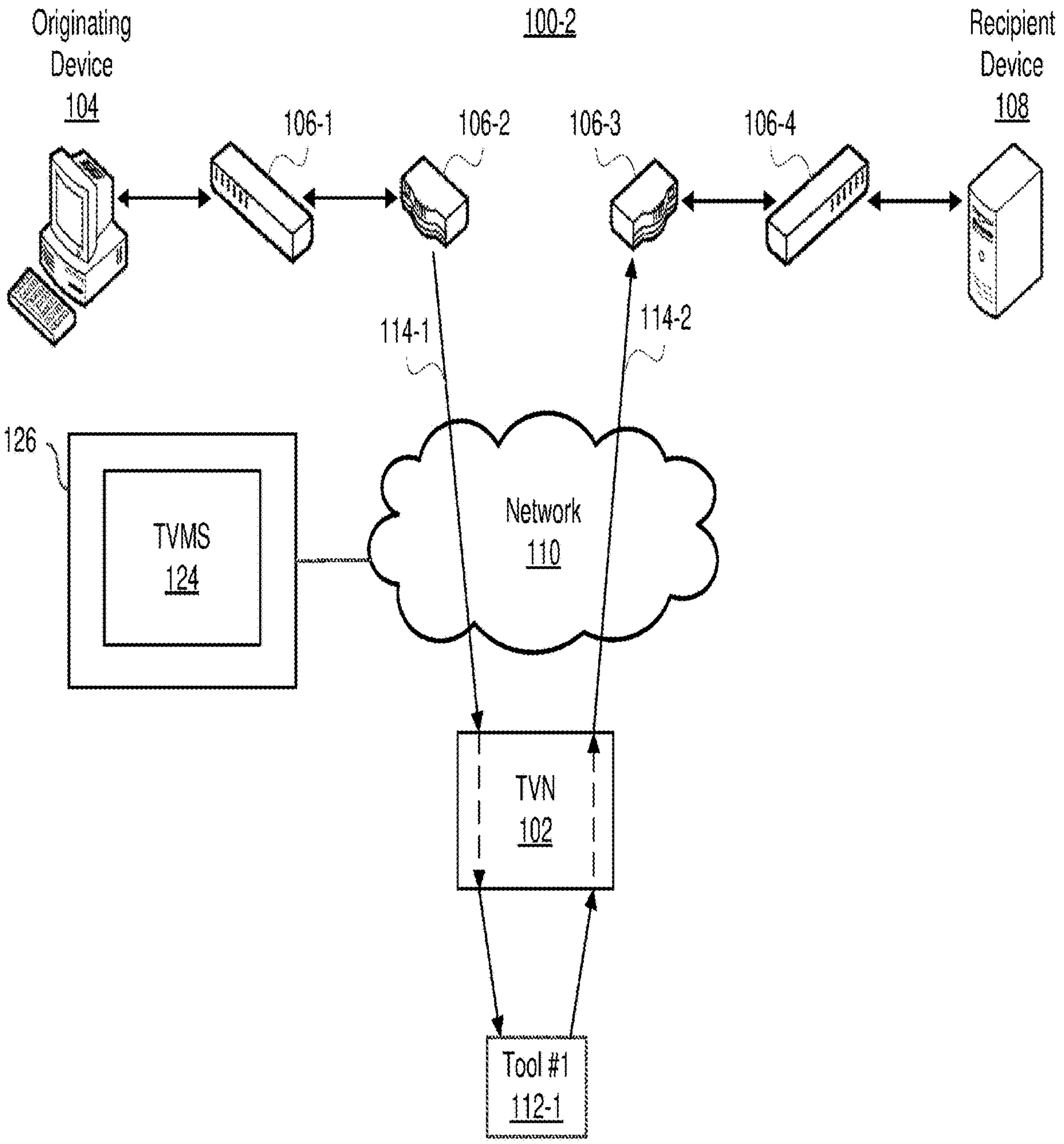
FIG. 1B depicts another example of a network arrangement in which a network visibility node receives data packets from a node in a computer network.

FIG. 1B illustrates an example path of a data packet as the data packet travels from an originating device 104 to a destination device 108. More specifically, FIG. 1B depicts a network arrangement 100-2 in which the TVN 102 and a network tool 112-1 are both deployed as inline devices (i.e., within the flow of network traffic).

Upon receiving a data packet from node 106-2, the TVN 102 identifies a flow map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the appropriate flow map could be identified based on the network port (of the network device) on which the data packet was received, or the source node from which the data packet was received.

The flow map represents a policy for how the data packet is to be handled by the TVN 102. For example, the flow map could indicate that the data packet is to be aggregated with another data packet, filtered, sampled, modified (e.g., stripped of a header or payload), or forwarded to one or more tool ports. Moreover, the flow map could specify that the data packet is to be transmitted in a one-to-one configuration (i.e., from a network port of the TVN 102 to a tool port of the TVN 102) or one-to-many configuration (i.e., from a network port of the TVN 102 to multiple tool ports of the TVN 102). Similarly, a single tool port of the TVN 102 could receive data packets from one or more network ports of the TVN 102.

Often, the data packet is passed by the TVN 102 to a tool port of the TVN 102 for transmission downstream to a network tool (e.g., a monitoring and/or security-related tool). Here, for example, the flow map may specify that the data packet is to be passed by the TVN 102 to a tool port for transmission downstream to tool 112-1. The network device may aggregate or modify the data packet in accordance with the policy specified by the flow map before passing the data packet to a tool port for transmission downstream to the network tool 112-1. In some embodiments, the TVN 102 includes multiple tool ports, each of which is coupled to a different network tool.

After analyzing the data packet, the tool 112-1 may transmit the data packet back to the TVN 102 (i.e., assuming the tool 112-1 does not determine that the packet should be blocked), which passes the data packet to a network port for transmission downstream to another node (e.g., node 106-3).

FIGS. 1A and 1B also show how a TVN 102 can be connected via a network 110 (e.g., a local area network (LAN) or the Internet) to a TVMS 124 running on a separate computer system 126. The TVMS 124 provides a user interface that may be used by a user (e.g., a visibility fabric administrator) to configure the traffic visibility fabric (e.g., TVN 102), including creating and editing traffic monitoring policies. The TVMS 124 also generates traffic visibility summary and statistical reports and outputs them to the user.

Figure 2:
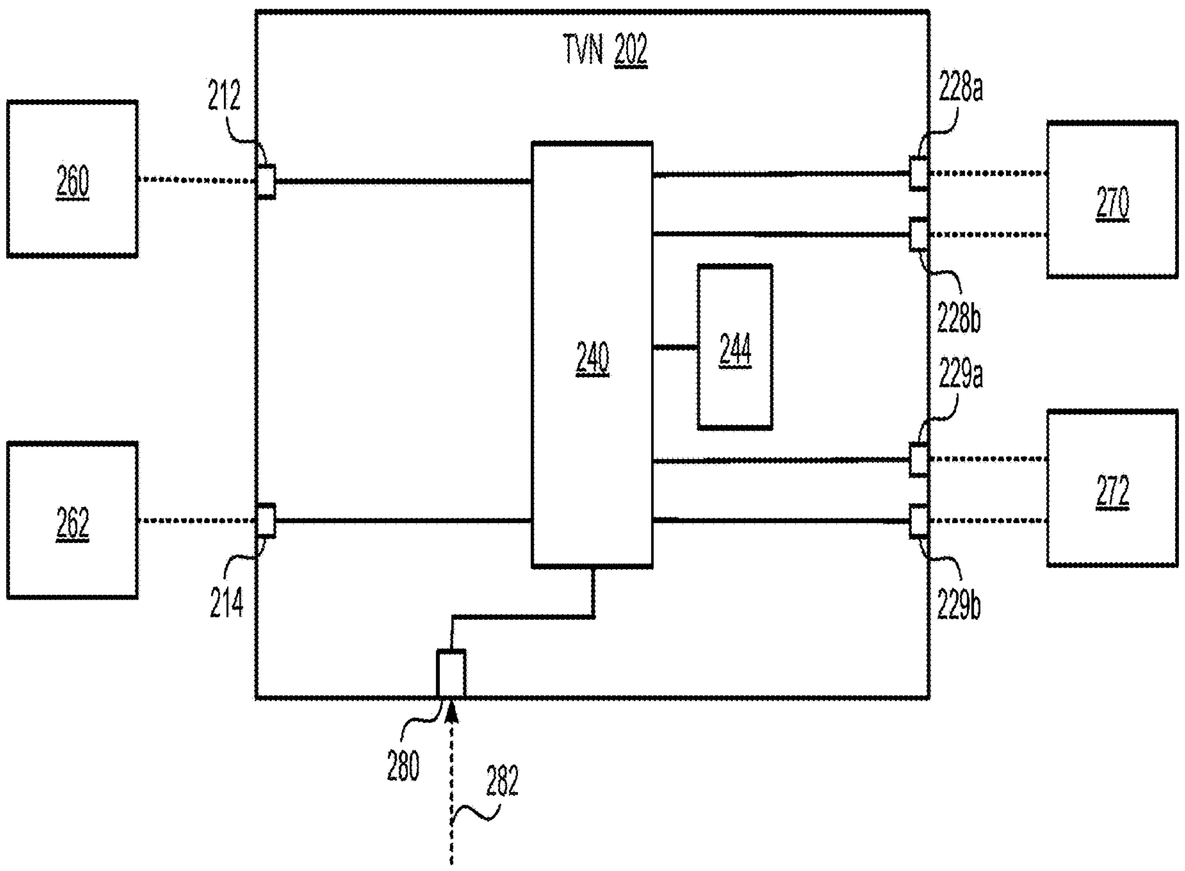
FIG. 2 is a block diagram showing an example of a network visibility node.

FIG. 2 is a block diagram showing an example of a TVN 202 that can be used as part of a traffic visibility fabric in either a containerized environment or (as shown in FIGS. 1A and 1B) in a non-containerized environment. TVN 202 can be representative of TVN 102 in FIGS. 1A and 1B. The example TVN 202 includes two network ports 212 and 214, a first pair of tool ports including an egress tool port 228*a* and an ingress tool port 228*b*, and a second pair of tool ports including an egress port 229*a* and an ingress port 229*b*. Although two network ports 212, 214 are shown, in other embodiments the TVN 202 may include more than two network ports. Also, although two tool ports 228, 229 are shown, in other embodiments, the TVN 202 may include only one tool port, or more than two tool ports.

Packets received by the TVN 202 are sent through tool egress port 228*a* to tool 270, which after processing those packets returns them to the TVN 202 through tool ingress port 228*b*. Similarly, packets received by the TVN 202 are sent through tool egress port 229*a* to tool 272, which after processing those packets returns them to the TVN 202 through tool ingress port 229*b*. In other embodiments the TVN 202 may contain more or fewer tool ports than four, and in operation, it may be coupled to more or fewer tools than two.

The TVN 202 also includes a packet switch ("switch module") 240 that implements selective coupling between network ports 212, 214 and tool ports 228, 229. As used in this specification, the term "tool port" refers to any port that is configured to transmit packets to or receive packets from an external tool. The TVN 202 further includes a processor 244, and may include a housing for containing the packet switch 240 and the processor 244. In other embodiments the TVN 202 may not have its own housing and may be implemented as a virtualized device. The processor 244 may be, for example, a general-purpose programmable microprocessor (which may include multiple cores), an application specific integrated circuit (ASIC) processor, a field programmable gate array (FPGA), or other convenient type of circuitry.

The TVN 202 may also include other components not shown, such as one or more network physical layers ("PHYs") coupled to each of the respective ports 212, 214, wherein the network PHYs may be parts of the packet switch 240. Alternatively, the network PHYs may be components that are separate from the integrated circuit 240. The PHY is configured to connect a link layer device to a physical medium such as an optical fiber, copper cable, etc. In other embodiments, instead of the PHY, the TVN 202 may include an optical transceiver, or a Serializer/Deserializer (SerDes), etc.

During operation of the TVN 202, the first network port 212 of the TVN 202 is communicatively coupled (e.g., via a network, such as a LAN or the Internet) to a first node 260, and the second network port 214 is communicatively coupled (e.g., via a network, such as a LAN or the Internet) to a second node 262. The TVN 202 is configured to communicate packets between the first and second nodes 260, 262 via the network ports 212, 214. Also, during operation, the tool ports 228, 229 of the TVN 202 are communicatively coupled to respective tools 270, 272. The tools 270, 272 may include, for example, one or more of an IDS, IPS, packet sniffer, monitoring system, etc. The tools 270, 272 may be directly coupled to the TVN 202, or communicatively coupled to the TVN 202 through the network (e.g., the Internet). In some cases, the TVN 202 is a single unit that can be deployed at a single point along a communication path.

In the illustrated embodiments, the packet switch 240 is configured to receive packets from nodes 260, 262 via the network ports 212, 214, and process the packets in accordance with a predefined scheme. For example, the packet switch 240 may pass packets received from one or more nodes to one or more tools 270, 272 that are connected to respective tool port(s) 228, 229, respectively.

The packet switch 240 may be any type of switch module that provides packet transmission in accordance with a predetermined transmission scheme (e.g., a policy). In some embodiments, the packet switch 240 may be user-configurable such that packets may be transmitted in a one-to-one configuration (i.e., from one network port to an tool port). Each of tool 270 and tool 272 may be an out-of-band device (i.e., it can only receive packets intended to be communicated between two nodes, and cannot transmit such packets downstream), such as a sniffer, a network monitoring system, an application monitoring system, an IDS, a forensic storage system, an application security system, etc. Alternatively, each of tool 270 and tool 272 may be an in-line device (i.e., it can receive packets, and transmit the packets back to the TVN 202 after the packets have been processed), such as an IPS. In other embodiments, the packet switch 240 may be configured such that the packets may be transmitted in a one-to-many configuration (i.e., from one network port to multiple tool ports). In other embodiments, the packet switch 240 may be configured such that the packets may be transmitted in a many-to-many configuration (i.e., from multiple network ports to multiple tool ports). In further embodiments, the packet switch 240 may be configured such that the packets may be transmitted in a many-to-one configuration (i.e., from multiple network ports to one tool port). In some embodiments, the one-to-one, one-to-many, many-to-many, and many-to-one configurations are all available for allowing a user to selectively configure the TVN 202 so that received packets (or certain types of received packets) are routed according to any of these configurations. In some embodiments, the packet movement configuration is predetermined such that when the TVN 202 receives the packets, the TVN 202 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of a TVN that may implement features and functions described herein include any of the GigaVUE® series of network visibility appliances available from Gigamon® Inc. of Santa Clara, California. An example of a virtualized TVN for a cloud environment is a GigaVUE V Series device from Gigamon Inc.

Containerized Environment

In a containerized environment, each container includes software code that provides one or more services. In a Kubernetes deployment, for example, each container is included in a "pod," and each pod can include multiple containers. Each pod is included within a worker node, and there may be multiple worker nodes in a given containerized deployment. Further, each worker node can contain multiple pods.

Figure 3:
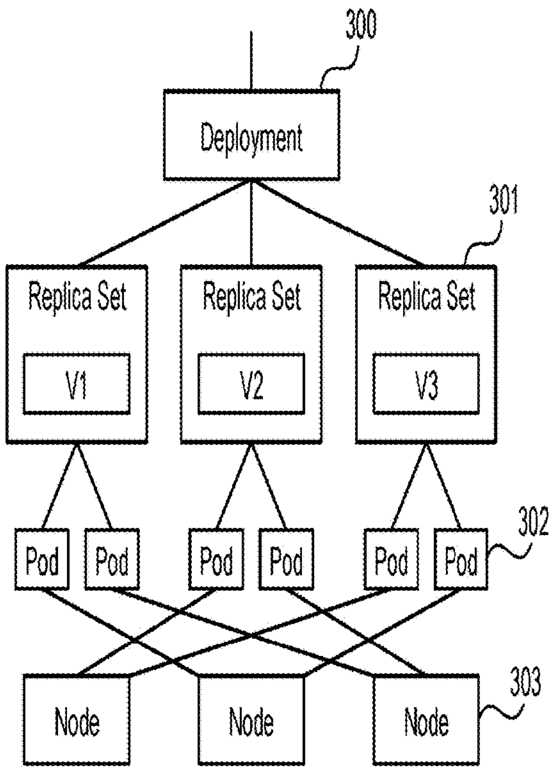
FIG. 3 shows an example of a Kubernetes deployment.
Figure 4:
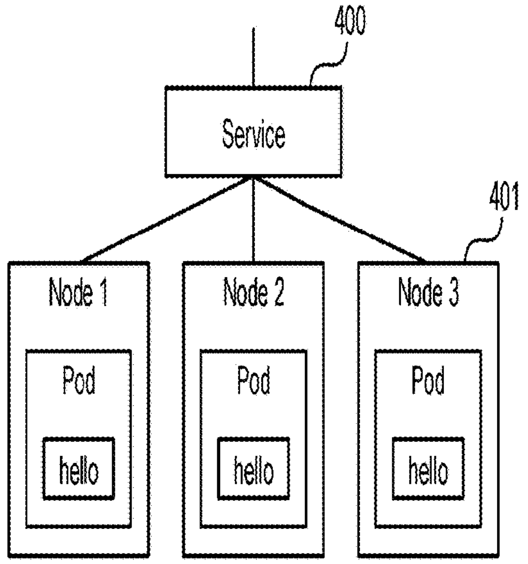
FIG. 4 shows an example of the relationship between services, nodes and pods in a Kubernetes deployment.

FIG. 3 shows an example of a Kubernetes deployment. A given containerized deployment 300 may include multiple replica sets, i.e., multiple instances of a given type of pod as shown. Each replica set 301 can correspond to, for example, a different version (e.g., V1, V2, V3) of a software program, and can include multiple pods, where each pod 302 is included within a particular one of multiple nodes 303 in the deployment 300. FIG. 4 shows an example of the relationship between services, nodes and pods in a Kubernetes deployment. As shown, a particular service (named "hello") can be made available by running it as various Pods across multiple nodes, such as Node1, Node2 and Node3.

Figure 5:
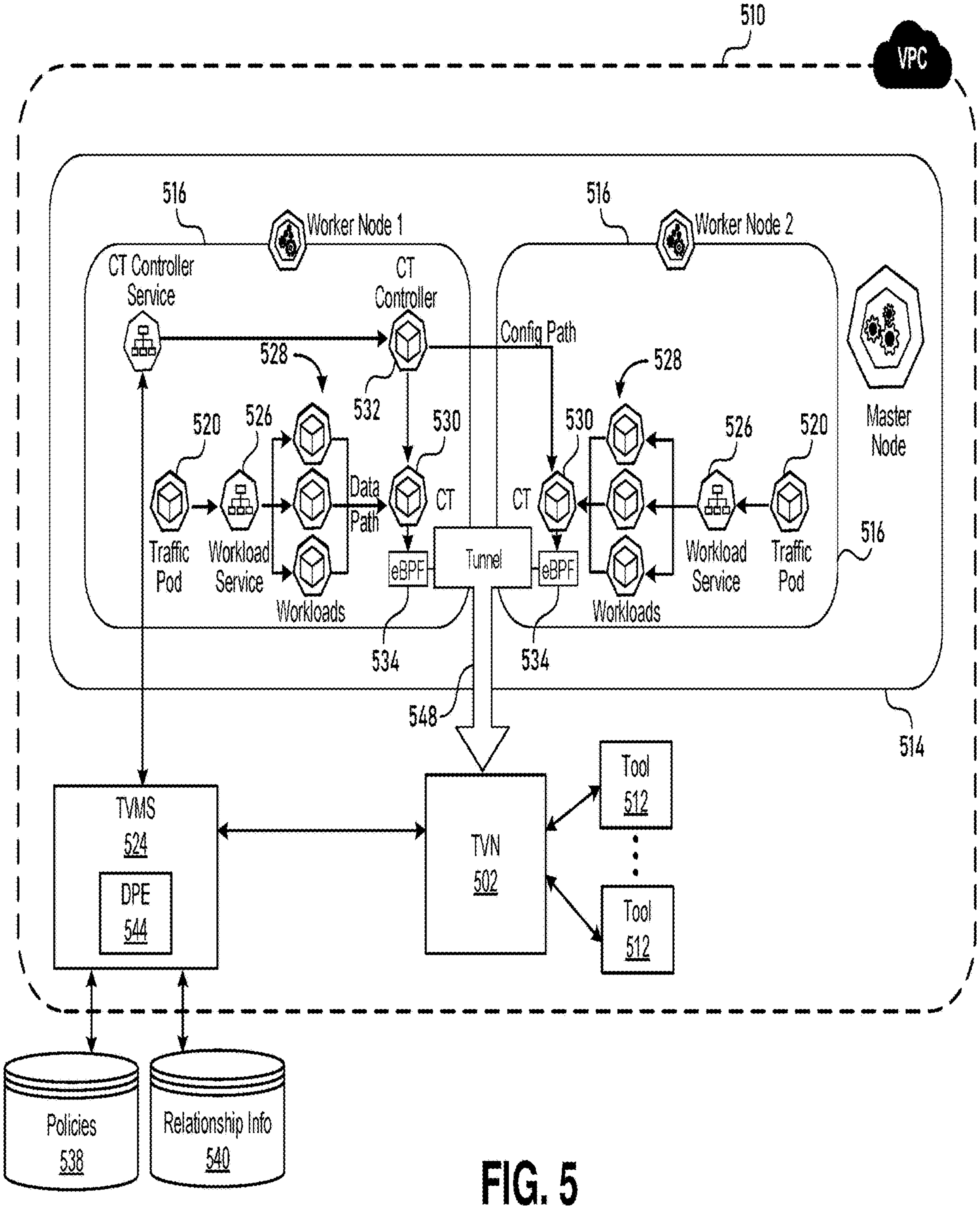
FIG. 5 illustrates an example of a containerized environment in which the dynamic adaptation of traffic monitoring policies can be performed.

FIG. 5 illustrates an example of a containerized environment in which the technique introduced here can be implemented. In the technique, a traffic visibility fabric is integrated with the containerized environment, The traffic visibility fabric includes a TVMS 524, at least one TVN 502 and one or more tools 512 coupled to the TVN 502 in the manner described above. Although only one TVN 502 is shown in FIG. 5, in some embodiments multiple TVNs 502 may be provided in a traffic visibility fabric, such as for load-balancing of traffic input to the visibility fabric.

To facilitate discussion, it is henceforth generally assumed herein that the containerized environment is a Kubernetes environment. However, it should be understood that the technique introduced here can be applied to, or can be easily modified to apply to, other types of containerized environments. Hence, the illustrated environment can be implemented in a virtual private cloud (VPC) 510. The environment includes a master node 514 and two or more worker nodes 516. Each worker node 516 includes at least one traffic pod 520 that generates data traffic in providing one or more workload services 526, which each generate one or more workloads 528.

Any particular worker node 516 may include a different type or types of traffic pod 520 than any other particular worker node, and therefore may provide different types of workload services 526 from any other worker node. Conversely, any particular type of traffic pod 520 may also be replicated across two or more of the worker nodes 516, such that two or more worker nodes 516 may provide the same or overlapping workload services 526.

The traffic visibility fabric in FIG. 5 also includes a containerized tap (CT) 530 within each worker node 516 that is to be monitored for traffic visibility. A CT 530 is a containerized utility component that automatically deploys as a pod within each worker node in the containerized environment, and sends traffic to one or more TVNs 502. A CT 530 can perform traffic acquisition, aggregation, basic filtering, replication, and tunneling support. In other words, a CT 530 is a container or pod, within a given worker node 516, that actually implements the traffic monitoring polices deployed by the TVMS 524 for that worker node.

At least one of the worker nodes 516 also includes a CT controller 532. Each CT 530 is registered with the TVMS 524 through the CT controller 532. The TVMS 524 deploys traffic monitoring policies and configuration data onto each CT 530 via the CT controller 532. The CT controller 532 collects statistics on filtered network traffic from each CT 530 and sends the collected statistics and heartbeats to the TVMS 524. Additionally, the CT controller 532 performs environment inventory collection, as described further below, and provides the information collected from this process to the TVMS 524.

Data traffic filtered (tapped) by a CT 530 is sent via a tunnel 548 (e.g., L2GRE or VxLAN tunnel) to the appropriate TVN 502. In at least some embodiments, as illustrated, an extended Berkeley packet filter (eBPF) hook 534 is installed in each worker node 516 and is used by its local CT 530 to implement the tunnel 548 between the CT 530 and the TVN 502. The CT 530 configures a data path in kernel space using the eBPF 534. The workloads 528 collect the network traffic and send the network packets to the kernel space. The kernel space filters (taps) the packets based on the policy rules and filters. The filtered (tapped) network packets can be tunneled directly to the specified tool(s) 512, or they can be sent to the specified tool(s) 512 through the specified TVN(s) 502. The TVN(s) 502 in this embodiment may be one or more virtualized devices running in the cloud environment.

In the disclosed technique, the TVMS 524 maintains various traffic monitoring policies 538 that include, for example, rules for traffic tapping and filtering, and for tunneling tapped data traffic to the TVN 502. Additionally, the TVMS 524 maintains detailed relationship information 540 about the physical and logical configuration of the containerized environment, and any changes that occur to the containerized environment, such as information on all nodes, namespaces, services, deployments, pod names, container identifiers (IDs), Internet protocol (IP) addresses and labels used in the environment. In at least some embodiments, the TVMS 524 stores this relationship information 540 in in-memory data structures, which are designed so that once they are populated, the relationships between various resources in the environment can be easily ascertained by the TVMS 524 from the data structures. For example, a service may front-end a set of pods, as illustrated in FIG. 4. Similarly, a deployment may have a set of replicas, i.e., multiple instances of a given type of pod.

The tables 601 through 604 in FIG. 6 collectively illustrate an example of how the data structures may be laid out in the relationship information 540 (FIG. 5), to facilitate this determination of the relationships between various resources in a given containerized environment. The tables 601 through 604 may be, may include, or may be part of, one or more relational databases, for example. By performing look-ups to one or more of the tables 601 through 604 and cross-referencing their contents in response to a change in the containerized environment, the TVMS 524 can identify all of the resources, at all levels in the containerization hierarchy, that are affected by the change. Table 601 lists all of the containers in the environment by their container ID, and for each container, indicates the container's name, podname, nodename, servicename, namespace, podips (pod IPS), nodeip (node IP address), serviceip (service IP address) and labels. Table 602 lists all of the pods in the environment by their pod ID, and for each pod, indicates the pod's name, nodename, servicename, namespace, podips and labels. Table 603 lists all of the services in the environment by their service ID's, and for each service, indicates the service's name, serviceport, serviceip, namespace, selector and labels. Table 604 lists all of the nodes in the environment by their node ID's, and for each node, indicates the node's name, IP address and labels. It can be seen that these tables can be easily cross-referenced with each other to identify relationships of resources across different levels in the containerization hierarchy.

Figure 7:
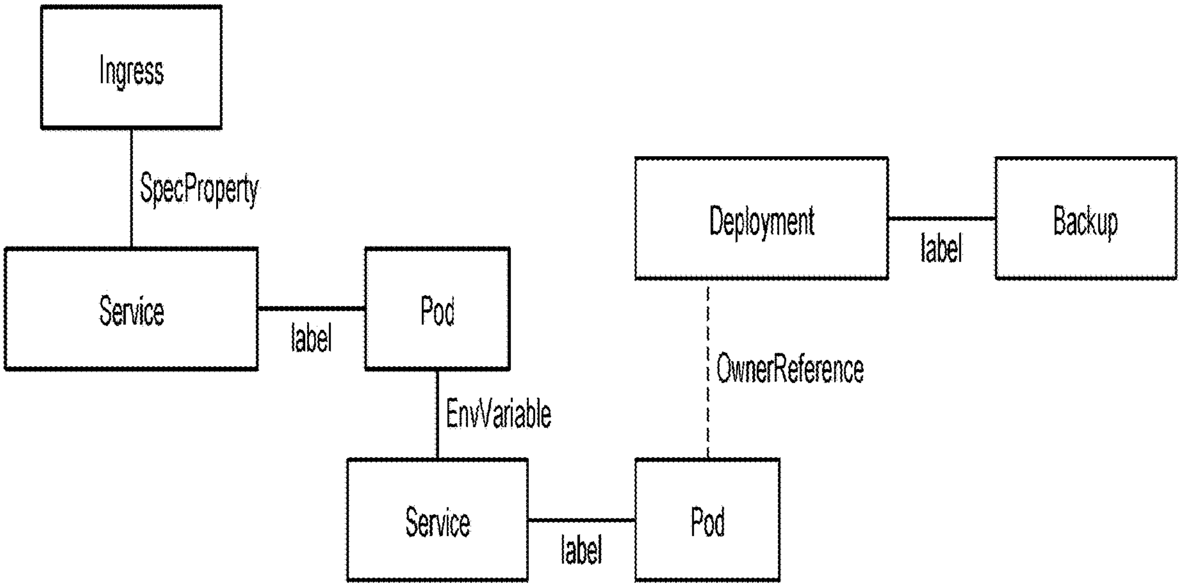
FIG. 7 illustrates an example of the logical/functional relationships between resources in a Kubernetes containerized environment, as may be represented in the data structures of the relationship information.

The configuration of the containerized environment is also called the "inventory," and the process of acquiring information about the configuration is therefore also referred to as "inventory collection." If inventory collection by the CT controller 532 is enabled (e.g., by the TVMS 524), then the CT controller 532 will collect full inventory on environment resources and store that information in its in-memory tables/data-structures. Upon collection of initial inventory, the CT controller 532 will push that inventory information to the TVMS 524. FIG. 7 illustrates an example of the logical/functional relationships between resources in a Kubernetes containerized environment, as may be represented in the data structures of the relationship information.

Traffic monitoring policies 538 can be defined by a user (e.g., a visibility fabric administrator) through a user interface of the TVMS 524. For example, in addition to traffic source selection, a user can specify rules specifying direction of traffic (e.g., ingress, egress or bidirectional), priority, action (e.g., pass packet, drop packet, push to user space for advanced processing), filters (e.g., L2, L3, L4, metadata, process name), and tunneling (e.g., destination information and type of tunnel encapsulation, such as VXLAN or GRE). An example of a traffic monitoring policy is to tap traffic from a discovered service that has three pods, and filter that traffic to allow only traffic to destination TCP port 80.

In accordance with the technique introduced here, the TVMS 524 includes a discovery and policy engine (DPE) 544 that intelligently transforms a specified policy to one or more containers running in the containerized environment. The DPE 544 also maps this set of containers to the nodes 516 where the containers are running and, based on that, determines the particular nodes to which the policies should get pushed. The DPE 544 can also intelligently determine the mapping of containers to process IDs, cgroups. The traffic monitoring policy then gets applied to the containers, pods, process IDs, cgroups, or any combination thereof.

At least some of the policies 538 can be overlapping, and therefore, the DPE 544 also allows users to specify a prioritization of policies in the event of overlap. The following is an example of an inventory change with overlapping, prioritized rules:

With pod overlaps:
- Policy 1—
  - Sources pod1, pod2
  - Rule filters—portSrc=8080, portDst=443.
- Policy 2—
  - Sources pod1, pod4
  - Rule filters—protocol=17.
- Policy 3—
  - Sources pod1, pod3
  - Rule filters—portSrc=80

With rule overlaps:
- Policy 1—
  - Sources pod1, pod2
  - Rule1 filters—portSrc=8080, portDst=443, priority=2
  - Rule2 filters—portSrc=80, priority=1

This example illustrates how, when there are overlapping policies/rules, the technique introduced here leverages the inventory in combination with the overlapping rules to tap and forward traffic based upon the matching (prioritized) rule.

Figure 8:
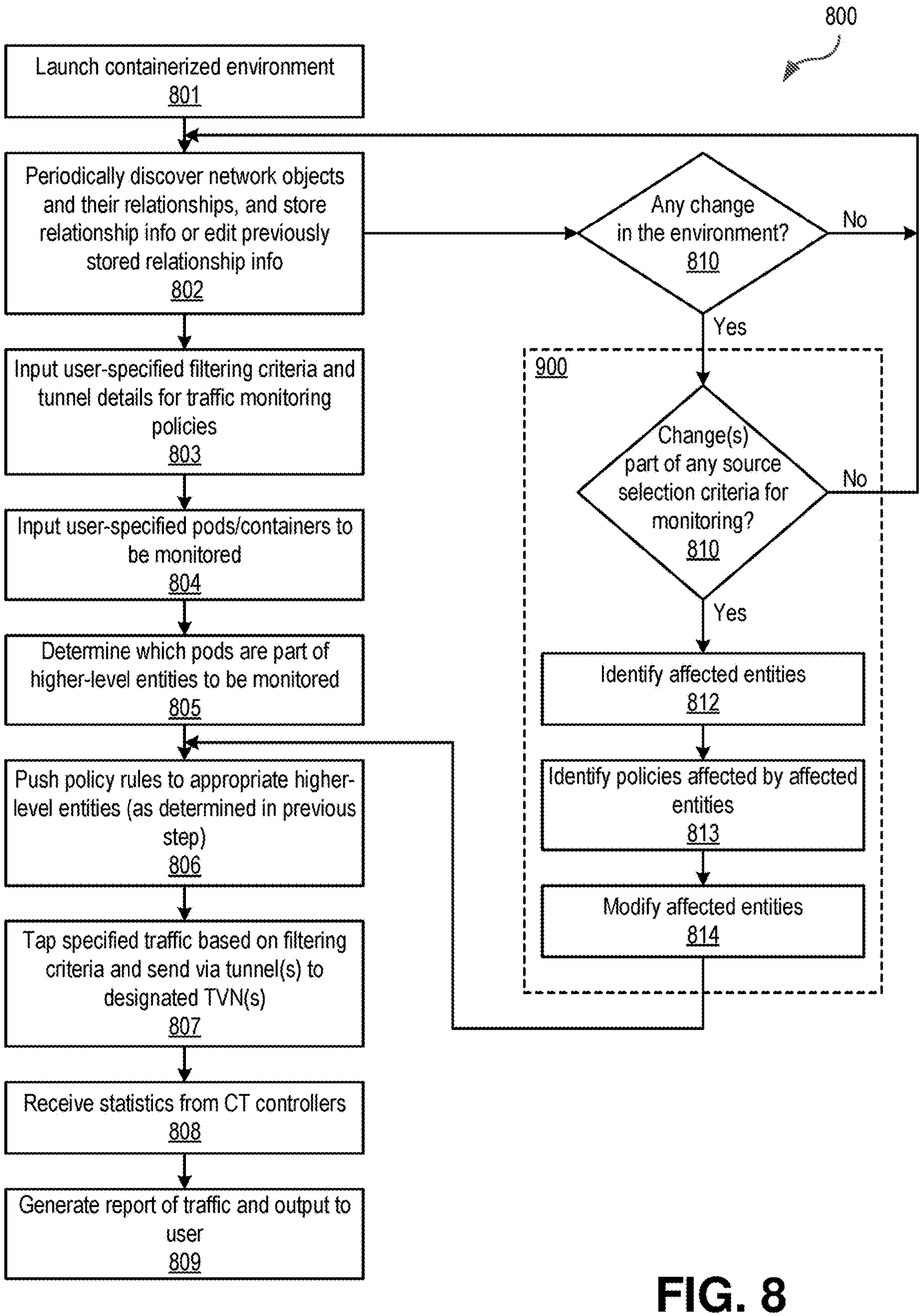
FIG. 8 illustrates an example of a process of automatic discovery of changes to a containerized environment and dynamic adaptation of traffic monitoring policies to such changes.

FIG. 8 illustrates an example of a process 800 of automatic discovery of changes to a containerized environment and dynamic adaptation of traffic monitoring policies to such changes. The steps in FIG. 8 can be implemented at least partially within a TVMS, such as TVMS 524 in FIG. 5. Initially, at step 801 the process 800 launches a containerized environment, an example of which is shown in FIG. 5 as discussed above. This may be done according to user-specified configuration criteria, which may be input by an administrative user to the TVMS 524. At step 802 the process 800 periodically discovers network objects in the environment and their relationships, and then stores relationship information reflecting what has been discovered or (if applicable) edits previously stored relationship information. For example, the process 800 discovers the nodes, name spaces, services, containers, IP addresses, labels, etc. In a Kubernetes environment, this step can be accomplished by using existing Kubernetes client libraries and REST API calls. For example, the Kubernetes-client/c (or kubernetes-client/go) library has support for setting callbacks on certain events. This feature can be leveraged to determine changes that occur in a Kubernetes cluster. As a change is detected, the change can be updated in the local CT controller's in-memory tables/data-structures and then pushed by the CT controller 532 to the TVMS. Alternatively, the CT controller 532 in a worker node 516 may collect inventory and pass it directly to the TVMS.

Steps 803 and 804 involve the creation or editing of policies (e.g., policies 538 in FIG. 5) for acquiring and monitoring data traffic from the containerized environment. Specifically, at step 803 the process 800 inputs (e.g., via a user interface of the TVMS 524) user-specified rules including packet filtering criteria and tunneling information defining where to tunnel out the captured data traffic. These rules form (at least in part) the various traffic monitoring policies 538 to be used in the containerized environment. At step 804 the process 800 inputs user-specified information specifying, in high-level terms, which containers or pods are to be monitored. For example, a user may specify that all pods associated with a specific service called Service A, or all pods running in a specific namespace called n1, or all pods that can be enabled under a specific node called N3. At step 805, based on the stored policy information resulting from steps 803 and 804, the process 800 determines which pods are part of higher level entities that are to be monitored, and at step 806 the process 800 pushes the relevant policy rules to the CT controller 532. At step 807 the process 800 taps specified traffic (packets) based on the policies, i.e., based on the specified filtering criteria and sends that via the specified tunnel(s) to one or more specified TVNs 502. In at least some embodiments, step 807 can be performed by a CT 530 in each node 516 to be monitored, as described above. At step 808 the TVMS 524 receives statistics on the tapped data from the CT controller 532. At step 809, the TVMS generates one or more reports regarding the tapped traffic, based on the received statistics.

As described above, step 802 involves discovering the configuration of the containerized environment, and this step is repeated periodically and/or in response to any changes being made. Accordingly, upon completion of step 802, in addition to proceeding to step 803 (discussed above), the process 800 also branches to step 810. In step 810, the process 800 determines whether there has been any change detected in the containerized environment. If there has been no change, then the process 800 loops back from step 810 to step 802. If on the other hand a change has been detected, then the process 800 begins a subprocess 900, including steps 811 through 814, which automatically determines which policies if any are affected by the changes and which modifies any affected policies in accordance with the changes. The subprocess 900 can be performed in parallel with the main process including steps 801 through 809. At step 811 the subprocess 900 determines whether the change or changes are part of any of the source selection criteria for monitoring the containerized environment. Source selection criteria can be, for example, "select all sources whose podname starts with 'web*'" or "select all sources which are associated with the service 'abcservice.'" If the change or changes are not part of the source selection criteria for a monitored source, the subprocess 900 loops back from step 811 to step 802. In this context, a change is considered "part of" a given source selection criterion if the affected entity (e.g., pod or container) is expressly included in the source selection criterion or if the affected entity is a part of a higher-level entity that is expressly included in the source selection criterion. If the change or changes are part of the source selection criteria for monitoring, then at step 812 the process 800 identifies the affected network entities, based on the stored relationship information. At step 813 the subprocess 900 identifies the policy or policies affected by the affected entity or entities, and at step 814 the subprocess appropriately modifies the affected policies in accordance with the changes to the environment. From step 814, the subprocess 900 branches to step 806, which pushes the modified policy rules to the UC controller(s) in the affected entities as described above.

One example of a change that may affect traffic monitoring policies is when pods or containers scale up or down. Another example is where a pod on a particular node, node 1, crashes, and a new pod therefore activates on another node, node 2, to replace it. The DPE will in that event determine whether any traffic monitoring policies need to be pushed to the CT on node 2. As a simple example, if the policy configured was to monitor node 1, then maybe no policy needs to be pushed. However, if the traffic policy was to monitor service A of which the crashed pod was a part, then one or more policies may need to be pushed to node 2. Similarly, when services are activated or deleted, or when a new node joins the cluster or an existing node is removed from a cluster, other resources such as pods and containers may be affected.

Figure 9:
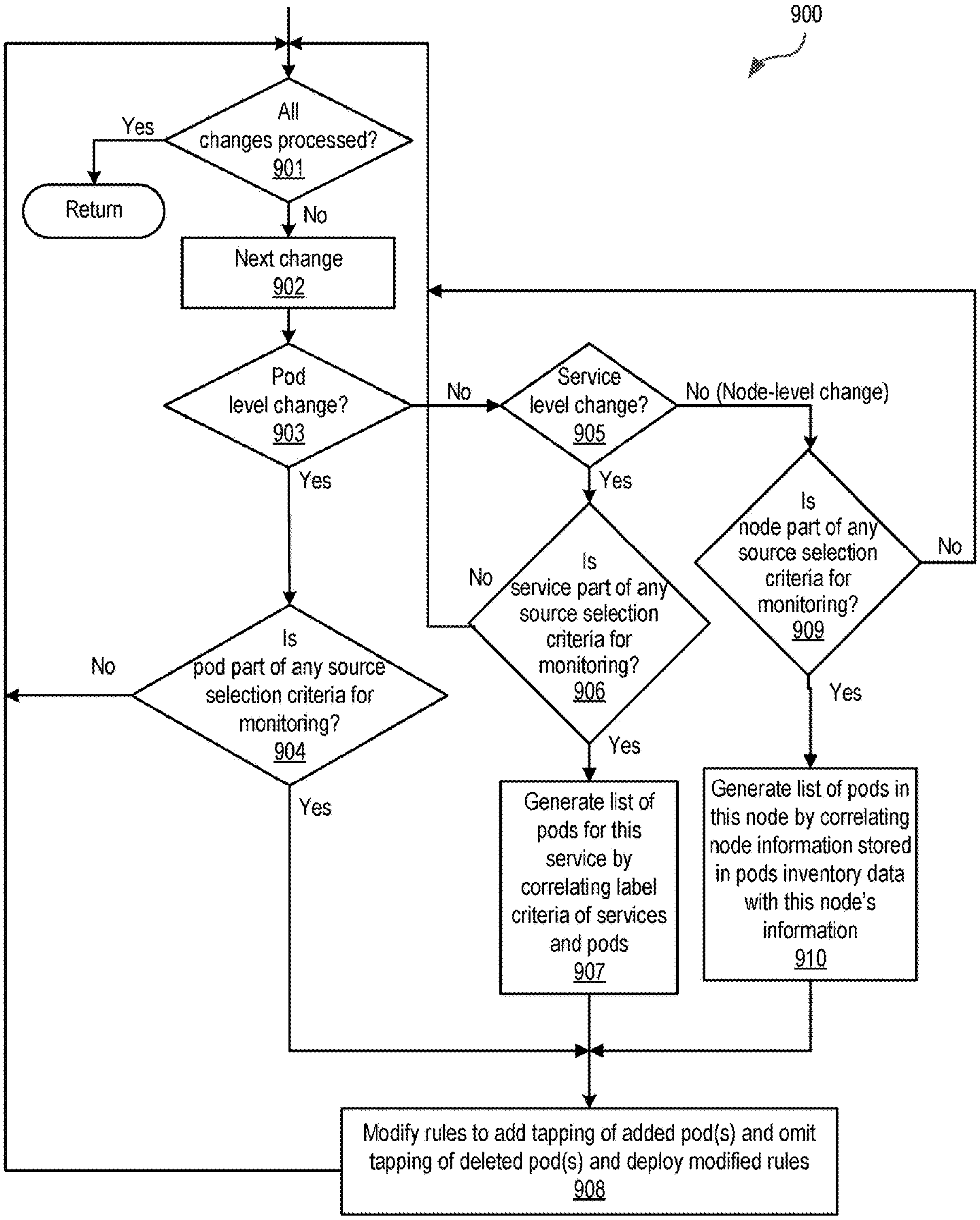
FIG. 9 illustrates an example of a subprocess of the process of FIG. 8.

FIG. 9 illustrates in greater detail an example of the subprocess 900, in which the impact of environmental changes on traffic monitoring policies is determined and policies are automatically and dynamically adapted. Referring now to FIG. 9, initially, if in step 901 not all of the detected changes to the containerized environment have been processed, the subprocess 900 proceeds to step 902. If all of the detected changes have been processed, the subprocess 900 returns to step 906 (FIG. 9).

In step 902, the subprocess 900 gets the next detected change that has not yet been processed. If the change is determined in step 903 to be a pod-level change (e.g., the express deletion or addition of a specified pod), then the subprocess 900 next determines at step 904 whether the affected pod is specified in the source selection criteria for monitoring, i.e., in the container. Note that Kubernetes currently does not manage containers directly, and only manages pods (each of which can include multiple containers). Accordingly, the process 900 in FIG. 9 is based on the assumption that traffic monitoring policies are managed down to the pod level of granularity, not to the container level of granularity. However, for containerization environments that allow management at the container level, the technique introduced here can be easily modified to allow discovery of changes in adaptation of traffic monitoring policies at the container level.

Referring again to FIG. 9, in step 904, if the specified pod is named "web-interface," step 904 may determine whether a policy exists containing the condition "podname starts with web*." If the specified pod is not specified in any source selection criteria for monitoring, then the process loops back to step 901, described above. If the specified pod is specified in any source selection criteria for monitoring, then the subprocess 900 proceeds to step 908, in which it modifies the stored policy rules to add tapping of the added or deleted pods and then deploys the modified policy rules to the appropriate nodes. For example, assume a new worker node is added to a Kubernetes cluster. Some pods will eventually get deployed on the new node, at some point in time. However, the policy rules do not initially state that those pods are to be monitored, but state that the newly added worker node is to be monitored. Step 908 will modify the policy rules to specify monitoring of the pods that are added to the newly added node, when they are added.

In conjunction with step 908, the subprocess 900 further may report the policy rule changes that have been made to a user (e.g., a visibility fabric administrator). In some embodiments or configurations, the subprocess 900 may propose the policy rule changes to a user and enable the user to accept or reject the changes, rather than deploying them automatically. The subprocess 900 then loops back to step 901.

If at step 903 the subprocess 900 determines that the currently selected change is not a pod-level change, then the subprocess 900 proceeds from step 903 to step 905. In step 905 the subprocess 900 determines whether the change is a service-level change. If the change is a service-level change, then at step 906 the subprocess determines whether the affected service is specified in any source selection criteria for monitoring. For example, in step 906 the subprocess 900 may determine whether a policy exists containing the condition "servicename endswith db*". If the affected service is not specified in any source selection criteria for monitoring, then the process loops back to step 901, described above. If the affected service is specified in any source selection criteria for monitoring, then the subprocess 900 next generates a list of pods that provide the affected service at step 907, by accessing the stored relationship information and correlating label criteria of services and pods in the stored relationship information. The process then at step 908 modifies the stored policy rules to add tapping of any pods that provide the affected service if the affected service has been added, or to omit tapping of any pods that provide the affected service if the affected service has been deleted. The process then loops back to step 901.

If the subprocess 900 determines that the current change is neither a pod-level change (step 903) nor a service-level change (step 905), then the change is a node-level change, in which case the subprocess 900 proceeds to step 909. In step 909 the subprocess 900 determines whether the affected node is specified in any source selection criteria for monitoring. For example, in step 909 the subprocess 900 may determine whether a policy exists containing the condition "nodename startswith prod*." If the affected node is not specified in any source selection criteria for monitoring, then from step 909 the process loops back to step 901, described above. If the affected node is specified in any source selection criteria for monitoring at step 909, then the subprocess 900 next generates a list of pods in the affected node at step 910, by accessing the stored relationship information and correlating node information stored in pod inventory data with the affected node's information in the stored relationship information. The subprocess then at step 909 modifies the stored policy rules to add tapping of any pods associated with the affected node if the affected node has been added or to omit tapping of any pods associated with the affected node if the affected node has been deleted. The process then loops back to step 901.

Figure 10:
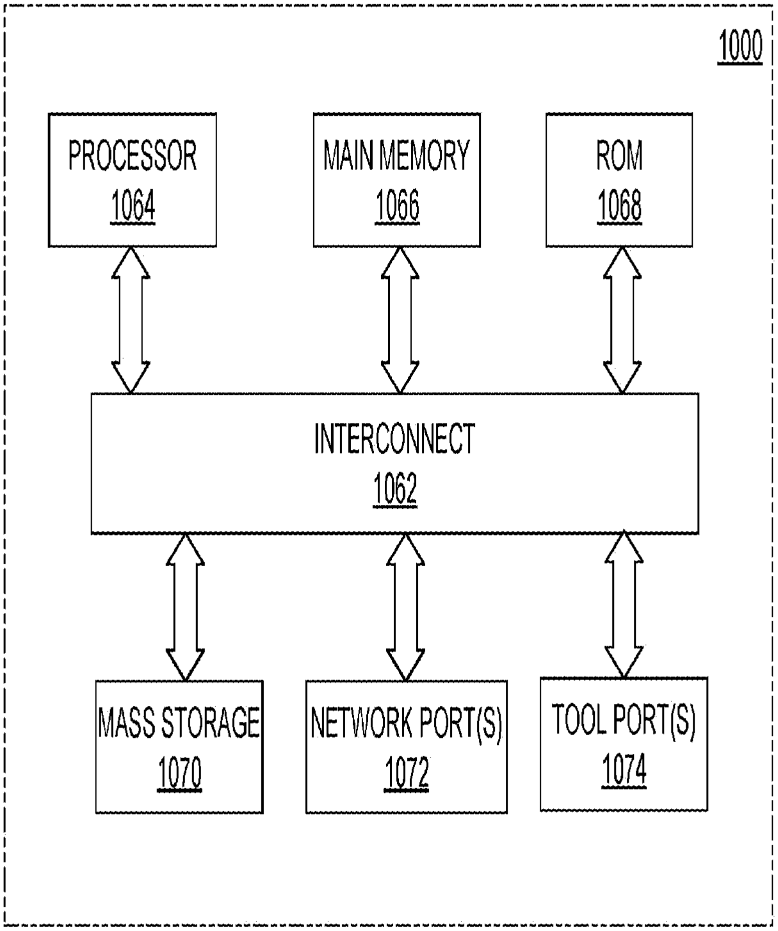
FIG. 10 is a block diagram of significant components of a processing system, representing a physical platform that can implement one or more of the components described herein.

FIG. 10 is a block diagram showing at least some of the significant components of a processing system 1000, representing a physical platform that can implement any one or more of the TVMS, a TVN, and/or other elements of a containerized environment. As shown, processing system 1000 includes an interconnect 1062 or other communication mechanism for communicating information, and at least one processor 1064 coupled with the interconnect 1062 for processing information. The interconnect 1062 may be or include, for example, one or more buses, adapters, point-to-point connections, or a combination thereof. The processor 1064 may be used to perform various functions described above. For example, in some embodiments the processor 1064 may perform or trigger encryption and decryption operations, inspect packet headers, generate, store and compare hash values/session IDs, etc. The processor 1064 can be implemented as programmable circuitry programmed/configured by software and/or firmware, or as special-purpose (hardwired) circuitry, or by a combination thereof. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

The processing system 1000 also includes a main memory 1066, such as a random access memory (RAM) or other dynamic storage device, coupled to the interconnect 1062 for storing information and instructions to be executed by the processor 1064. The main memory 1066 also may be used for storing temporary variables or other intermediate information during execution of instructions to be executed by the processor 1064. The processing system 1000 further includes a read only memory (ROM) 1068 or other static storage device coupled to the interconnect 1062 for storing static information and instructions for the processor 1064. A mass storage device 1070, such as a magnetic, solid-state or optical disk, is coupled to the interconnect 1062 for storing information and instructions. The processing system 1000 further includes one or more physical network ports 1072 coupled to the interconnect 1062, through which the processing system 1000 can communicate over one or more networks with one or more external devices. At least in a case where processing system 1000 is a TVN, processing system 1000 further includes one or more physical tool ports 1074 coupled to the interconnect 1062, through which the processing system 1000 can communicate with a corresponding one or more tools.

The processing system 1000 may be used for performing various functions described above. According to one embodiment, such use is provided by system 1000 in response to processor 1064 executing one or more sequences of one or more instructions contained in the main memory 1066. Such instructions may be read into the main memory 1066 from another computer-readable medium, such as storage device 1070. Execution of the sequences of instructions contained in the main memory 1066 causes the processor 1064 to perform the process steps described herein. One or more processors in a multi-processing arrangement may also be employed to execute the sequences of instructions contained in the main memory 1066. In alternative embodiments, hard-wired circuitry may be used in place of or in combination with software instructions to implement features of the embodiments described herein. Thus, embodiments described herein are not limited to any specific combination of hardware circuitry and software.

Unless contrary to physical possibility, it is envisioned that (i) the methods/steps described herein may be performed in any sequence and/or in any combination, and that (ii) the components of respective embodiments may be combined in any manner.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, tablet computer, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the present invention has been described with reference to specific exemplary embodiments, it will be recognized that the invention is not limited to the embodiments described, but can be practiced with modification and alteration within the spirit and scope of the appended claims.

Accordingly, the specification and drawings are to be regarded in an illustrative sense rather than a restrictive sense.

What is claimed is:

1. A method comprising:

accessing a plurality of traffic monitoring policies for acquiring and monitoring data traffic transmitted between one or more components of a containerized environment, the containerized environment including a plurality of nodes including a plurality of software-implemented containers;

causing the plurality of traffic monitoring policies to be applied to one or more components in the containerized environment, so that each policy of the plurality of traffic monitoring policies is applied by a containerized programmatic entity within at least one node of the plurality of nodes;

detecting a change to a configuration of the containerized environment; and in response to detecting the change to the configuration of the containerized environment, automatically identifying one or more containers of the plurality of software-implemented containers, as containers affected by the change, determining a modification of a traffic monitoring policy of the plurality of traffic monitoring policies, based on a result of the identifying, to produce a modified traffic monitoring policy, and causing the modified traffic monitoring policy to be applied to one or more components in the containerized environment, by sending a message to one of the plurality of nodes, to cause the containerized programmatic entity within one or more of the plurality of nodes to apply the modified traffic monitoring policy.

2. The method of claim 1, wherein the plurality of traffic monitoring policies comprise policies for tapping data traffic in the containerized environment and routing the tapped data traffic to a network traffic visibility node.

3. The method of claim 1, wherein the modification of the traffic monitoring policy comprises addition or deletion, from one or more stored data traffic tapping rules, of the one or more containers affected by the change.

4. The method of claim 1, wherein the containerized environment further comprises a plurality of services, the method further comprising:

maintaining relationship information indicative of relationships amongst the plurality of software-implemented containers, the plurality of nodes and the plurality of services; and using the relationship information to identify the one or more containers affected by the change and to determine the modification of the traffic monitoring policy.

5. The method of claim 4, wherein the containerized environment further comprises one or more deployments and a plurality of namespaces, and wherein the relationship information further comprises information indicative of relationships amongst the one or more deployments, the plurality of namespaces, the plurality of software-implemented containers, the plurality of nodes and the plurality of services.

6. The method of claim 1, wherein the change to the configuration of the containerized environment consists of addition or deletion of a service provided by the one or more of the plurality of software-implemented containers.

7. The method of claim 1, wherein the change to the configuration of the containerized environment consists of addition or deletion of a node that includes the one or more of the plurality of software-implemented containers.

8. The method of claim 1, wherein identifying the one or more of the plurality of software-implemented containers as being affected by the change comprises:

identifying a particular node or a particular service in the containerized environment as having been added or deleted as part of the change;

determining that a particular container, of the plurality of software-implemented containers, is included in the particular node or provides the particular service; and in response to determining that the particular container is included in the particular node or provides the particular service, identifying the particular container as being affected by the change.

9. The method of claim 1, wherein identifying the one or more of the plurality of software-implemented containers as being affected by the change comprises:

identifying a particular node in the containerized environment having been added or deleted as part of the change;

determining that a particular container, of the plurality of software-implemented containers, is included in the particular node; and in response to determining that the particular container is included in the particular node, identifying the particular container as being affected by the change.

10. The method of claim 1, wherein identifying the one or more of the plurality of software-implemented containers as being affected by the change comprises:

identifying a particular service in the containerized environment as having been added or deleted as part of the change;

determining that a particular container, of the plurality of software-implemented containers, provides the particular service; and in response to determining that the particular container provides the particular service, identifying the particular container as being affected by the change.

11. The method of claim 1, wherein the plurality of nodes comprise a plurality of worker nodes, and wherein detecting the change to the configuration of the containerized environment comprises acquiring inventory related information about the containerized environment from a tap controller in the one of the worker nodes after the tap controller collects and locally stores the inventory related information.

12. The method of claim 11, wherein causing the modified traffic monitoring policy to be applied to one or more components in the containerized environment comprises pushing the modified traffic monitoring policy to the tap controller, wherein the tap controller is configured to cause a container in a local worker node to implement the modified traffic monitoring policy.

13. A processing system comprising:

a network interface through which to communicate with at least one other processing system via a network;

a processor coupled to the network interface; and a storage device coupled to the processor and storing instructions, execution of which by the processor causes the processing system to perform operations comprising:

accessing a plurality of traffic tapping policies for tapping data traffic transmitted between one or more components of a containerized environment, the containerized environment including a plurality of plurality of nodes and a plurality of software-implemented containers distributed amongst the plurality of nodes;

causing the plurality of traffic tapping policies to be applied to one or more containers of the plurality of software-implemented containers, so that each policy of the plurality of traffic tapping policies is applied by a containerized programmatic entity within at least one node of the plurality of nodes;

detecting a change to a configuration of the containerized environment; and in response to detecting the change to the configuration of the containerized environment, automatically identifying one or more containers of the plurality of software-implemented containers, as containers affected by the change, and determining a modification of a traffic tapping policy of the plurality of traffic tapping policies, based on a result of the identifying, to produce a modified traffic tapping policy; and causing the modified traffic tapping policy to be applied to one or more components in the containerized environment, by sending a message to one of the plurality of nodes, to cause the containerized programmatic entity within one or more of the plurality of nodes to apply the modified traffic monitoring policy.

14. The processing system of claim 13, wherein the modification of the traffic tapping policy comprises addition or deletion, from one or more stored data traffic tapping rules, of the one or more containers affected by the change.

15. The processing system of claim 13, wherein the containerized environment further comprises a plurality of services, further comprising:

maintaining relationship information indicative of relationships amongst the plurality of software-implemented containers, the plurality of nodes and the plurality of services; and using the relationship information to identify the one or more containers affected by the change and to determine the modification of the traffic tapping policy.

16. The processing system of claim 15, wherein the containerized environment further comprises one or more deployments and a plurality of namespaces, and wherein the relationship information further comprises information indicative of relationships amongst the one or more deployments, the plurality of namespaces, the plurality of software-implemented containers, the plurality of nodes and the plurality of services.

17. The processing system of claim 13, wherein the change to the configuration of the containerized environment consists of addition or deletion of a service provided by the one or more of the plurality of software-implemented containers.

18. The processing system of claim 13, wherein the change to the configuration of the containerized environment consists of addition or deletion of a node that includes the one or more of the plurality of software-implemented containers.

19. The processing system of claim 13, wherein identifying the one or more of the plurality of software-implemented containers as being affected by the change comprises:

identifying a particular node or a particular service in the containerized environment as having been added or deleted as part of the change;

determining that a particular container, of the plurality of software-implemented containers, is included in the particular node or provides the particular service; and in response to determining that the particular container is included in the particular node or that provides the particular service, identifying the particular container as being affected by the change.

20. The processing system of claim 13, wherein detecting the change to the configuration of the containerized environment comprises acquiring inventory related information about the containerized environment from a tap controller in the one of the nodes.

21. The processing system of claim 20, wherein causing the modified traffic tapping policy to be applied to one or more components in the containerized environment comprises pushing the modified traffic monitoring policy to the tap controller, wherein the tap controller is configured to cause one or more containers in one or more of the nodes to implement the modified traffic tapping policy.

* * * * *